US009150178B1

(12) United States Patent
Jayasuriya et al.

(10) Patent No.: US 9,150,178 B1
(45) Date of Patent: Oct. 6, 2015

(54) SEATBELT RESTRAINT SYSTEM FOR REVERSIBLE VEHICLE SEAT (71) Applicant: FORD GLOBAL TECHNOLOGIES, LLC, Dearborn, MI (US)

(72) Inventors: Mangala A. Jayasuriya, Bloomfield Hills, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/204,204

(22) Filed: Mar. 11, 2014

(51) Int. Cl.
*B60N 2/22* (2006.01)
*B60R 21/02* (2006.01)
*B60N 2/02* (2006.01)
*B60N 2/20* (2006.01)
*B60R 22/34* (2006.01)
*B61D 33/00* (2006.01)

(52) U.S. Cl.
CPC .............. *B60R 21/02* (2013.01); *B60N 2/0292* (2013.01); *B60N 2/203* (2013.01); *B60N 2/22* (2013.01); *B60N 2/2213* (2013.01); *B60R 22/34* (2013.01); *B61D 33/0028* (2013.01); *B60N 2002/2204* (2013.01); *B60R 2022/3402* (2013.01)

(58) Field of Classification Search
CPC ................... B60N 2/22; B60N 2/2213; B60N 2002/2204; B60N 2/203; B60N 2/0292; B61D 33/0028; B61R 21/02; B61R 22/34
USPC ....................................... 297/353, 383, 94, 96
See application file for complete search history.

(56) References Cited

U.S. PATENT DOCUMENTS

| | | | | |
|---|---|---|---|---|
| 1,564,401 | A | * 12/1925 | Bell | .............................. 297/96 X |
| 7,125,076 | B2 | 10/2006 | Beranek et al. | |
| 7,281,761 | B2 | 10/2007 | Brown et al. | |
| 7,644,982 | B2 | * 1/2010 | Paluch | .......................... 297/94 X |
| 7,954,902 | B2 | 6/2011 | Haas et al. | |

* cited by examiner

*Primary Examiner* — Anthony D Barfield
(74) *Attorney, Agent, or Firm* — Frank MacKenzie; Price Heneveld LLP (57) ABSTRACT

A vehicle seat includes a back and a cushion. A mounting assembly supports the cushion and includes a first mounting arm coupled with the back and rotatable with respect to the cushion such that the back is translatable over the cushion. The vehicle seat further includes a first restraint arm coupled with the seat back and operatively coupled with the first mounting arm such that translation of the seat back drives corresponding rotation of the first restraint arm.

20 Claims, 7 Drawing Sheets

SEATBELT RESTRAINT SYSTEM FOR REVERSIBLE VEHICLE SEAT

FIELD OF THE INVENTION

The present invention generally relates to a restraint system for use in connection with a reversible vehicle seat. Components of the restraint system are operatively coupled with the reversing mechanism of the seat such that they are repositioned in a manner that corresponds with reconfiguration of the seat from a forward-facing position to a rearward-facing position.

BACKGROUND OF THE INVENTION

Various types of reversible or reconfigurable vehicle seats have been used to accommodate different seating directions and positions for occupants in vehicles. By way of example, some vehicle seats allow for repositioning thereof between at least a forward-facing position, wherein the occupant faces the front of the vehicle, and a rearward-facing position, wherein the occupant faces toward the rear of the vehicle. A number of different seat configurations can provide for such repositioning, including those in which the seat rotates on a horizontal plane, about a vertical axis, among positions.

For seats in particular locations of certain vehicles, horizontal rotation-based reconfiguration may not be possible. For example, front seats in a car (such as the driver's seat in a fully-autonomous vehicle, for example) as well as rear or middle row seats in larger vehicles may be positioned too close to one another or adjacent vehicle components to rotate between positions. Accordingly, some reversible seats have been developed in which the seatback is moveable over and independently of the seat cushion. Such arrangements provide a forward-facing position with the seatback toward the rear of the cushion and a rearward-facing position with the seatback toward the front of the cushion. In these arrangements, the seatback has two opposite seating surfaces for respective use in the forward- or rearward-facing configurations. Because the components of the seat move separately from each other during reconfiguration and not as a single unit (as may be the case in horizontally-rotating reversible seats), seatbelt components may also need to be repositioned between seat configurations.

Accordingly, there is a need for a restraint system and a vehicle seat incorporating such a restraint system that provides for reconfiguration of components thereof in response to vehicle seat repositioning.

SUMMARY OF THE INVENTION

According to one aspect of the present invention, a vehicle seat includes a back and a cushion. A mounting assembly supports the cushion and includes a first mounting arm coupled with the back and rotatable with respect to the cushion such that the back is translatable over the cushion. The vehicle seat further includes a first restraint arm coupled with the seat back and operatively coupled with the first mounting arm such that translation of the seat back drives corresponding rotation of the first restraint arm.

According to another aspect of the present invention, a vehicle restraint system includes a buckle assembly having a first arm with a buckle receptacle mounted thereon and having a first rotational coupling opposite the receptacle and a first gear axially aligned with the first rotational coupling. The system further includes an anchor having a body and further having a second rotational coupling and a second gear affixed with the body and axially aligned with each other. A webbing is affixed with the body of the anchor, and a buckle insert receives the webbing therethrough and is removably affixable with the buckle receptacle.

According to another aspect of the present invention a vehicle includes a seat having a back, a cushion, and a mounting assembly supporting the cushion and coupled with the back such that the back is translatable over the cushion. The vehicle further includes a restraint system having a restraint arm coupled with the back and operatively coupled with the mounting assembly such that translation of the back drives corresponding rotation of the restraint arm. The restraint system also has a seatbelt webbing retractably mounted within the seat back.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
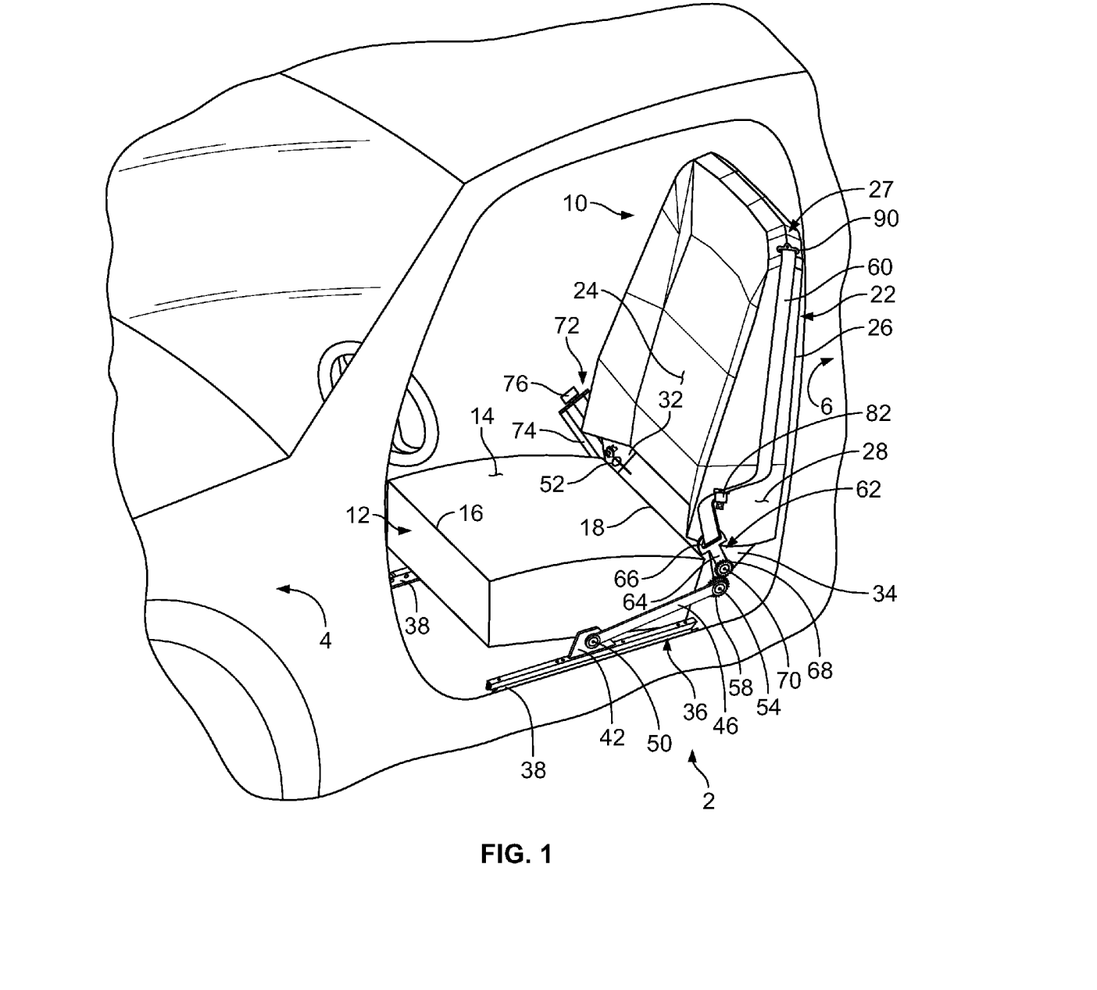
FIG. 1 is a partial view of a vehicle including a seat according to an embodiment of the present disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Figure 3:
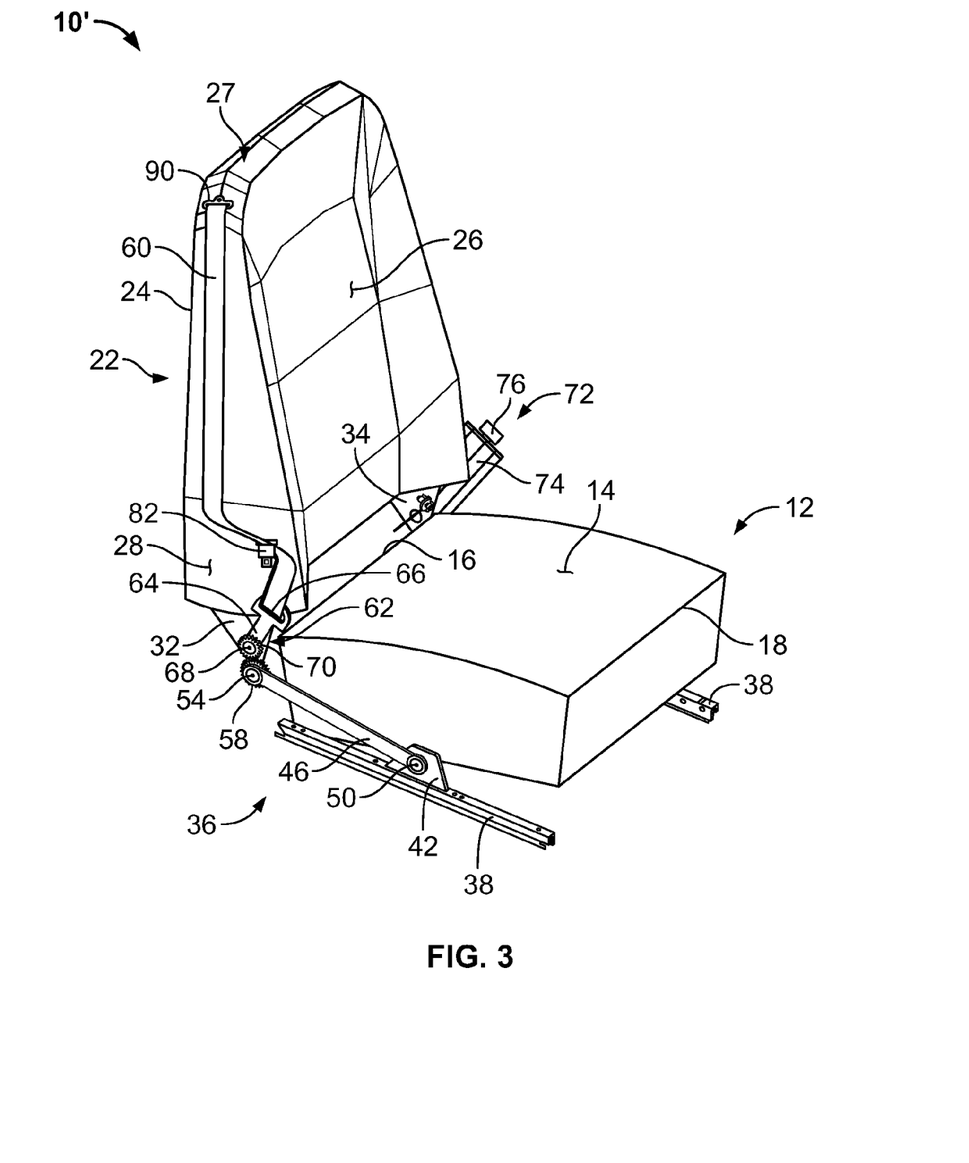
FIG. 3 shows the vehicle seat of FIG. 1 in a reversed configuration.

Referring now to FIG. 1, reference numeral 10 generally designates a seat of the type useable in motor vehicle 2. In an example, vehicle 2 may be an autonomous vehicle, which may permit the occupant seated in the driver's position, in which the example of seat 10 in FIG. 1 is depicted, to sit in a forward-facing position. Seat 10 is depicted as a single-occupant seat or a "captain" seat, as opposed to a bench seat or the like, which are configured for multiple users. Seat 10 includes a cushion 12 and a seatback 22 that are movably mounted to each other and appropriately configured to be mounted within the interior of a vehicle in one of a number of locations. In particular, seat 10 is depicted as a "reversible" seat in which seat 10 can be configured in a forward-facing position, as shown in FIG. 1, and a rearward-facing position, as shown in FIG. 3. Such configuration can be generally achieved by movement of the seatback 22 including translation thereof in a forward-rearward direction over cushion 12, as will be discussed further below.

As shown in FIG. 1, seat cushion 12 includes a seating surface 14 that is generally shaped to support the lower body of an occupant of the seat. Cushion 12 includes a front edge 16 and a rear edge 18 disposed on opposite sides thereof. Depending on the particular construction of cushion 12, a sharp or distinct edge may not be defined, but a forward- or rearward-most portion or a seam bounding the seating surface 14 may be present, for example, that can be understood to represent such an edge 16 or 18. When seat 10 is assembled in vehicle 2, for example, cushion 12 is positioned such that front edge 16 is itself or is adjacent the closest portion of cushion 12 to the front 4 of vehicle 2, and rear edge 18 is itself or is adjacent the closest portion of cushion 12 to the rear 6 of vehicle 2. Such designations, however are used herein with respect to seat 10 for reference only, as the reversible nature of the seat 10 (and its ability to be positioned on either side of vehicle 2 or in other locations within vehicle 2, such as the middle or rear rows of seats) means that either of the edges 16 or 18 could be positioned toward either end 4 or 6 of vehicle 2.

Cushion 12 is coupled within vehicle 2 by a mounting assembly 36 that can include, for example, a pair of supports 40 and 42 positioned along opposite sides of cushion 12. Supports 40 and 42 can be mounted onto sliding members of tracks 38, which are coupled with other parts of the sliding track system and to the seat cross beams or chassis (not shown) of the vehicle 2. Mounting assembly 36 further includes a pair of mounting arms 44 and 46 extending respectively from supports 40 and 42 to which they are respectively pivotably coupled about pivot points 48 and 50. Mounting arms 44 and 46 are generally rigid, elongate members configured to support and position seatback 22 in both forward-facing and rearward-facing positions, as discussed herein. There can be additional release and locking members to secure seatback 22 to cushion 12 or track members 38, as used in other known vehicle seats. It is noted that mounting assembly can be concealed within portions of the cushion 12 and/or seatback 22 or within cosmetic covers or the like assembled with seat 10 (not shown).

Seatback 22 is pivotably coupled with mounting arms 44 and 46 at respective pivot points 52 and 54 such that mounting arms 44 and 46 support seatback 22 in desired positions with respect to cushion 12. As shown in FIG. 1, one such position can be a forward-facing position in which seatback 22 extends in a generally upward direction from adjacent rear edge 18 of cushion 12 such that front seatback surface 24 is open to and generally facing seating surface 14 of cushion 12.

In such a position, mounting arms 44 and 46 extend in a generally rearward direction from supports 40 and 42 such that the connections with seatback 22 at points 52 and 54 are adjacent rear edge 18 of cushion 12.

Figures 2A, 2B:
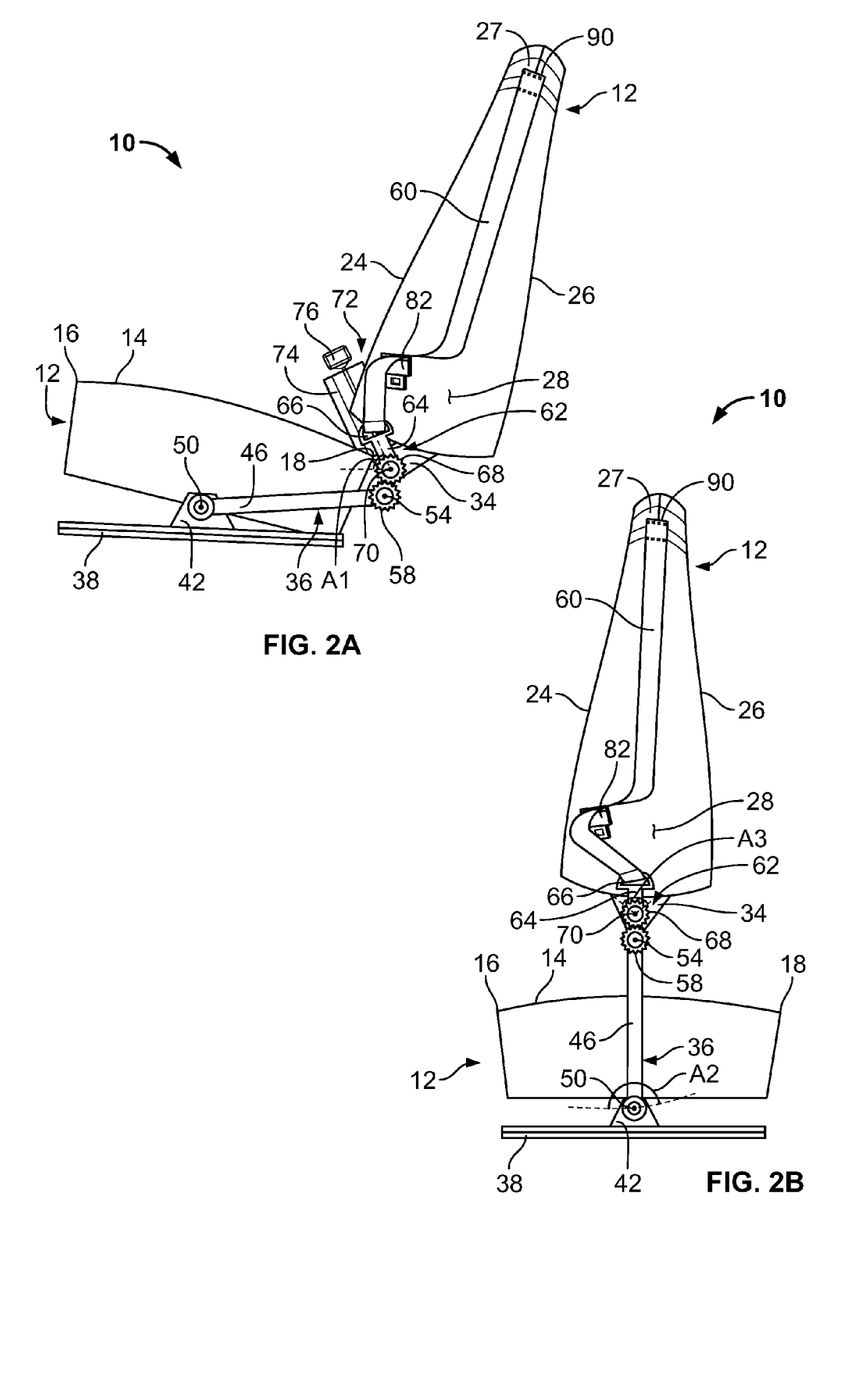
FIGS. 2A-2D show various configurations of the seat of FIG. 1, including in a repositioning sequence and during use of a corresponding restraint system.
Figures 2C, 2D:
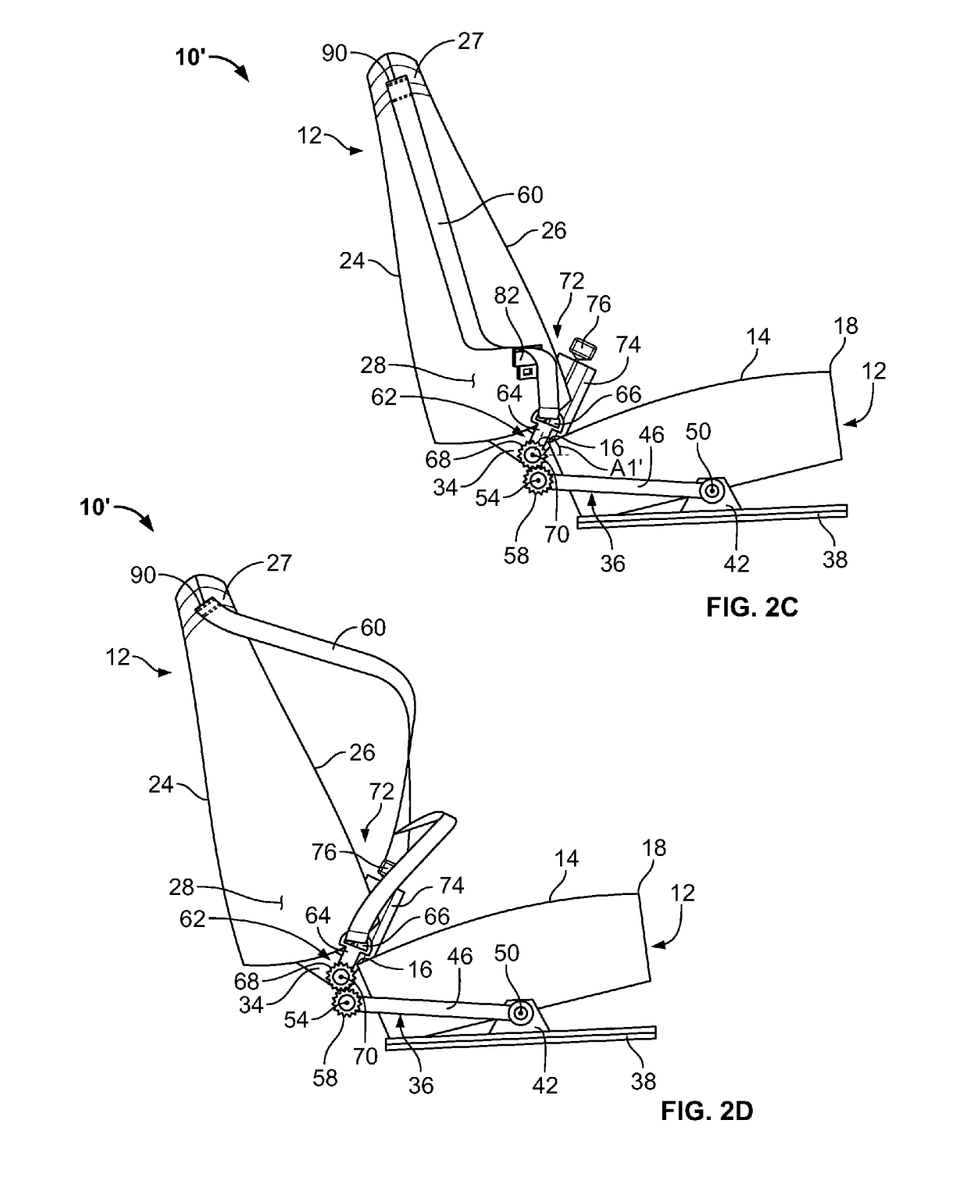

FIGS. 2A-2C show seat 10 in transition from the forward facing position (seat 10 in FIG. 2A) to the rearward-facing position (seat 10' in FIG. 2C). It is noted that seat 10 is referred to as seat 10' when discussed specifically with respect to the rearward-facing position and may otherwise generally be referred to as seat 10. The discussion of seat 10, accordingly, is intended to apply to the seat both in the forward-facing position and in a general sense, without exclusion of the seat 10' in the rearward-facing position, unless otherwise stated. As shown in FIG. 2B, movement of seatback 22 is permitted by rotation of mounting arms 44 and 46 on the respective pivot points 48 and 50 with supports 40 and 42. By such rotation the pivot points 52 and 54 at which seatback 22 is coupled with arms 44 and 46 can be repositioned adjacent front edge 16 of cushion 12 with seatback 22 extending generally upwardly therefrom such that rear seatback surface 26 is open to and generally facing seating surface 14 of cushion 12, as shown in FIG. 2C and FIG. 3.

As further shown in FIGS. 2A-2C, cushion 12 can be pivotably coupled with supports 40 and 42 at points 48 and 50 (or at locations axially aligned therewith) such that cushion 12 can have a range of tilting motion, as illustrated, such that seating surface 14 is tilted rearward (as shown in FIG. 2A) or forward (as shown in FIG. 2C) according to the forward or rearward seating configurations. Such tilting can be linked to rotation of mounting arms 44 and 46 or can be independent therefrom. Other mechanisms within seat 10 can provide for adjustment of the forward or rearward tilting positions according to the preferences of the occupant. Further, user-operable mechanisms can provide for the releasable locking of seat 10 in either position.

The generally upright positioning of seatback 22 in both the forward-facing and rearward-facing positions can be such that seatback 22 is angled so as to be somewhat reclined when in the forward-facing configuration of seat 10 or the rearward-facing configuration of seat 10'. Such variation in the exact positioning of seatback 22 is to be understood within the meaning of a generally upright position. Mounting assembly 36 can be configured to maintain such positioning of seatback 22 in a generally upright configuration and can further be configured to provide substantially matching recline positions in the forward-facing and rearward-facing configurations for seat 10 and 10'. To achieve such configuration, mounting assembly 36 can include cables, motors, actuators, additional arms in a linkage arrangement with mounting arms 44 and 46, or other mechanisms or devices not depicted herein. Further, seat 10 can also include additional mechanisms (not shown) to allow the occupant of the seat to make additional adjustments to the particular recline angle of seatback 22.

Figures 4, 5:
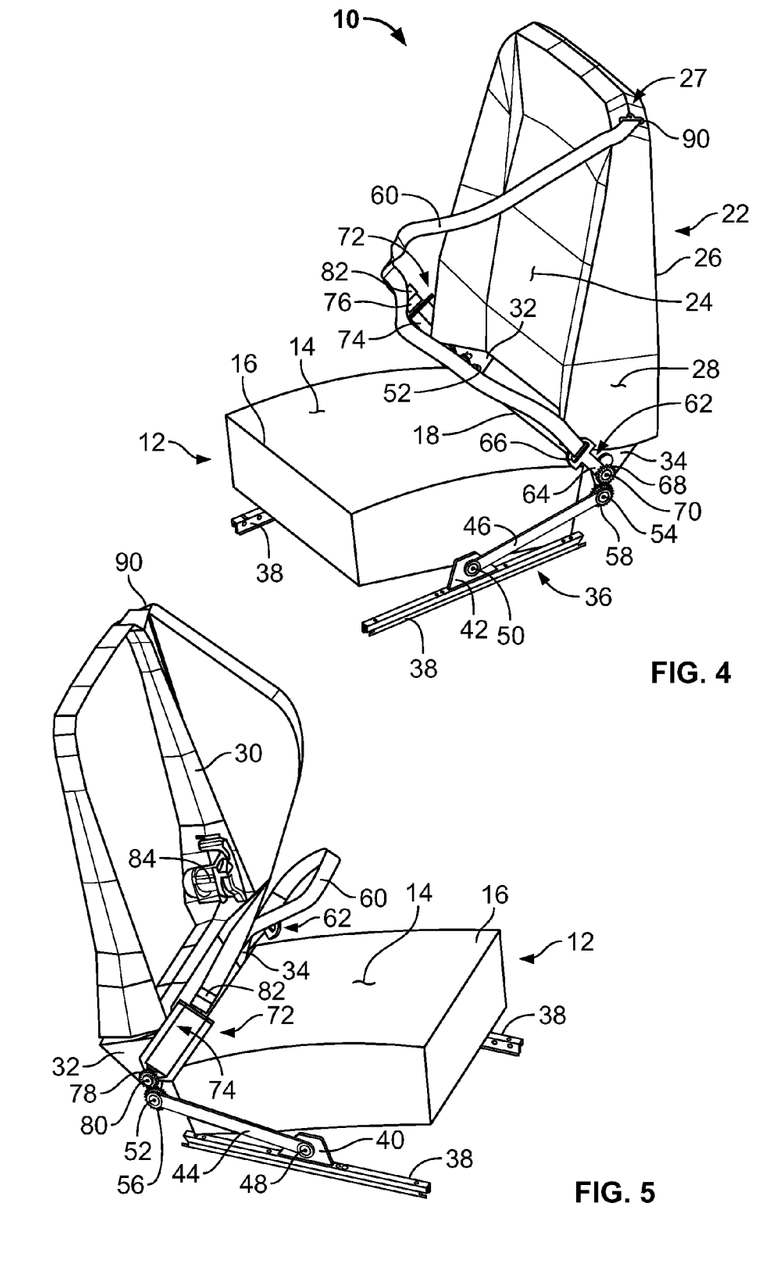
FIG. 4 shows the seat of FIG. 1 in the original configuration during use of the restraint system thereof.
FIG. 5 shows internal features of the seat of FIG. 1 in the original configuration, and including components of the restraint system in accordance with an embodiment of the present disclosure.

A restraint system for use with seat 10 or another reversible seat of a generally similar configuration is described herein. As shown in FIG. 1, the restraint system is in the form of a particularly-adapted three-point seatbelt, including a seatbelt webbing 60 that can be extended over the torso and lap of an occupant of the seat and appropriately secured, as shown in FIGS. 2D, 4 and 5. As illustrated, webbing 60 is configured to extend from seatback 22 near an upper portion 27 thereof so as to be positioned generally in the area of an occupant's shoulder. Webbing is coupled with anchor assembly 62, which is positioned on the side of seatback 22 from which the webbing 60 extends. Further, a buckle assembly 72 (as illustrated in FIG. 5, which shows seat 10 in the forward-facing position from the side of buckle assembly 72) is positioned opposite from anchor assembly 62 and is configured such that buckle insert 82, which slidably receives webbing 60, can be releasably coupled therewith to secure webbing 60 in a buckled configuration over the occupant of seat 10.

Figure 6:
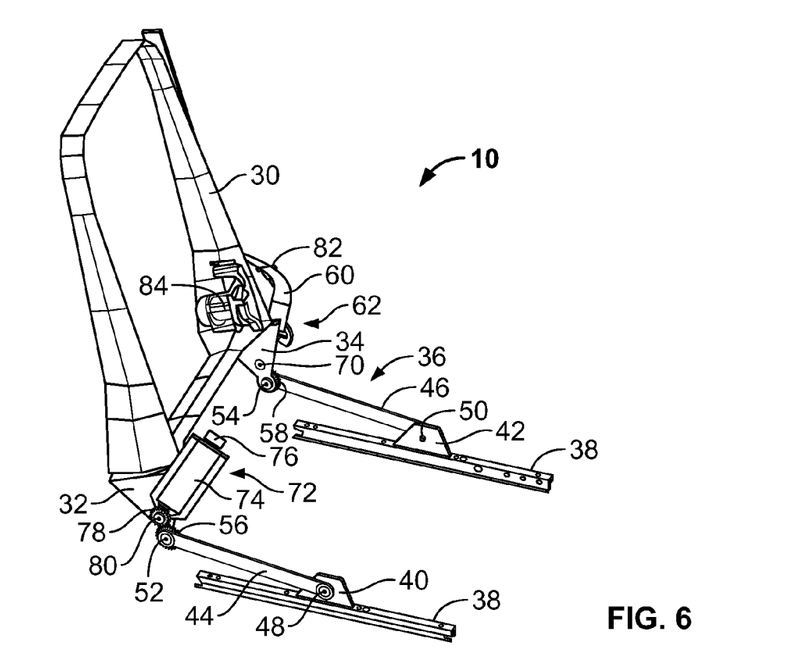
FIG. 6 shows the internal view of the seat of FIG. 5 with additional portions removed.
Figure 8:
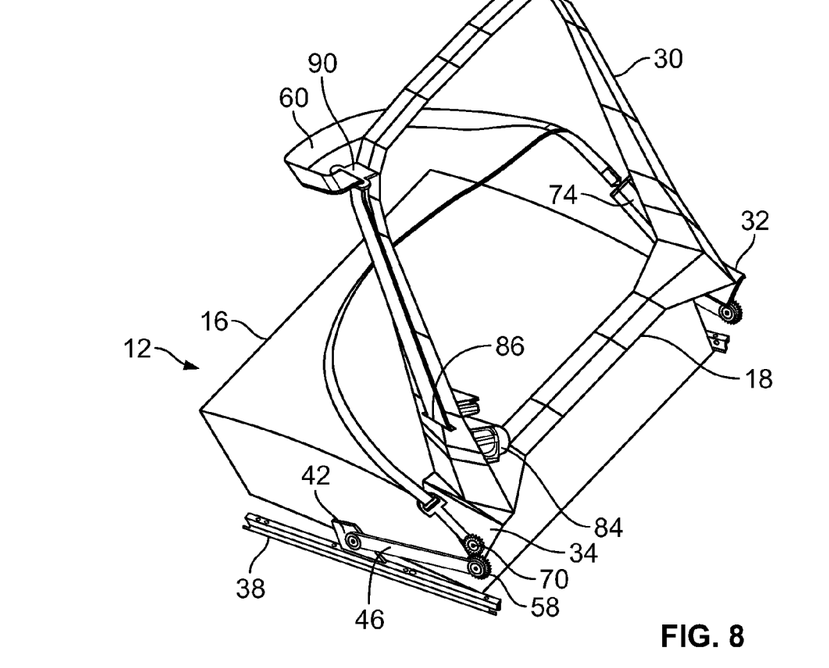
FIG. 8 shows the internal view of the seat of FIG. 6 from an alternative view.

As shown in FIGS. 4-6, all of the above-mentioned components of the restraint system are coupled with and extend from the seat 10. In this configuration, the components move with seat 10 during reconfiguration between the forward-facing and rearward-facing positions discussed above. This configuration can allow for access to and use by the occupant of seat 10 in both of the aforementioned positions. In particular, FIG. 6 shows retractor 84 coupled to seatback frame 30 so as to be internal to seatback 22. Retractor 84 includes a spool or the like onto which webbing 60 is rolled such that a needed length of webbing 60 can be pulled out to extend over the wearer, as shown in FIG. 4. The spool is spring-biased to both maintain the webbing 60 over the user and to retract the pulled-out length of webbing 60 when the seatbelt is removed. In an example, retractor 84 may further include a ratchet and/or clutch mechanism to lock the unwinding of webbing 60 during a crash, abrupt breaking, or the like. Accordingly, retractor 84 provides an adjustable anchor for one, variable end of the webbing 60. As can be seen in FIGS. 6 and 8, webbing 60 passes through a slot 86 or other routing feature through frame 30 in a location adjacent retractor 84 and extends upward toward positioner 90, which is structured to provide an opening in seatback 22 through which webbing 60 passes to be accessible to the occupant.

Positioner 90 is located on seatback 22 within the upper portion 27 thereof to provide the above-described positioning for webbing 60 to extend over the shoulder of the occupant. As shown in FIG. 8, positioner 90 is structured as a rigid insert of metal, plastic or a combination of plastic and metal that can be coupled to the seatback frame 30 and that defines a slot sized for webbing 60 to freely pass therethrough when extended. As shown in FIGS. 6 and 8, positioner 90 is configured to extend in a generally lateral direction between the front seatback surface 24 and the rear seatback surface 26. This configuration is such that webbing 60 extends from seatback 22 so as to lie along the outer surface 28 of seatback 22 when in a refracted position, as shown in FIGS. 1 and 3. By being oriented in a generally neutral position with respect to the seatback surfaces 24 and 26, webbing 60 can extend from positioner 90 in substantially the same manner when in use in either the frontward- or rearward-facing position, as can be seen in the examples of seat 10' in FIG. 2C and seat 10 in FIGS. 4 and 5.

On the same side of seat 10 as positioner 90, anchor assembly 62 is coupled with the seat 10 to secure the end of webbing 60 opposite the end coupled with retractor 84. Anchor assembly 62 includes a body 64 of a rigid material such as steel or the like. Body 64 is configured as an elongate arm with a slot 66 or D-ring structure on a free end thereof. Anchor assembly 62 is pivotably coupled at pivot point 70 with a portion of seatback 22, such as bracket 34, which also couples frame 30 with arm 46. In another example, anchor assembly 62 can be coupled directly to frame 30 or another appropriate portion of seatback 22. Such pivotable coupling is preferably maintained by an appropriate rotational coupling structure including a fastener such as a bolt secured with a nut or the like or by a rivet assembly, etc. A bushing, bearing, or other insert can be used to provide the pivotable nature of the coupling.

In addition to securing the associated end of webbing 60 to seat 10, anchor assembly 62 contributes to the positioning of the portion of webbing 60 that extends over the lap of the occupant of seat 10. As such, the direction at which anchor assembly 62 extends from pivot point 70 can be such that webbing 60 is positioned in a desirable manner, which for example, can be such that anchor assembly 62 extends at an angles A1 and A1' (when in the respective positions of seat 10 and seat 10') that are between the seating surface 14 of cushion 12 and the seatback surface 24 or 26 that is intended for use in the corresponding seating position (forward- or rearward-facing) of seat 10. As shown in the FIGS. 2A-2C, angles A1 and A1' are determined with respect to a horizontal reference line passing through pivot point 70, although other determinations for the angle of anchor assembly 62 are possible. In general it is desired that angles A1 and A1' be such that anchor assembly 62, and the adjacent portion of webbing 60 are disposed toward the edge 16 or 18 over opposite that which seatback 22 is positioned. In other words, when seat 10 is in the forward-facing position, it is desired that anchor assembly 62 be disposed toward the front 4 of vehicle 2, as shown in FIG. 1. Conversely, when seat 10 is in the rearward-facing position, it is desired that anchor assembly 62 be disposed toward the rear 6 of vehicle 2. The particular angles A1 and A1' can vary in such a configuration and can be, according to one embodiment, between 50° and 80°, measured clockwise and counterclockwise, respectively, from horizontal. In another embodiment, angle A1 can be between 30° and 60° or about 50°.

Figure 7:
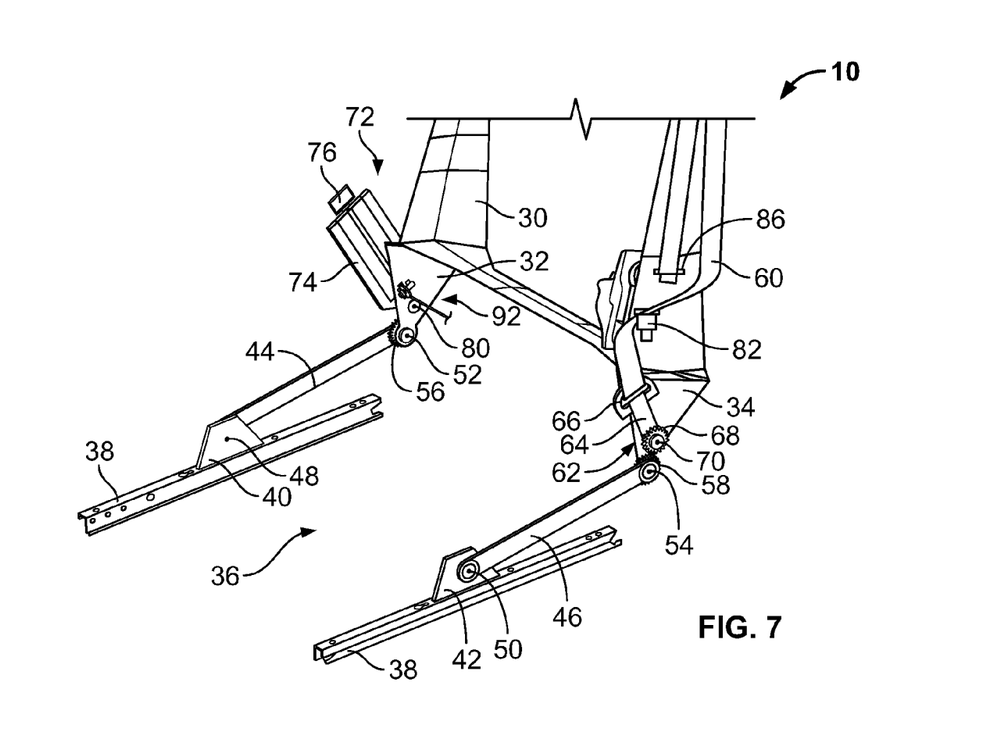
FIG. 7 is a partial view showing additional internal features of the seat in the forward-facing position, including additional components of the restraint system.

To provide the described positioning for anchor assembly 62, particularly when moving seat 10 between the forward- and rearward-facing positions, the pivoting of anchor assembly 62 can be constrained relative to the movement of seatback 22 between its related positions. As shown in FIGS. 6 and 7, such constrained pivoting can be provided by gear 68 included within anchor assembly 62 and rigidly coupled with the body 64 thereof about pivot point 70 so as to coincide with the location of the rotational coupling between body 64 and bracket 34. Such rigid coupling of gear 68 with body 64 can at least in part be achieved by the same structure used for coupling of anchor assembly 62 with seatback 22, discussed above, with appropriate features engaging between gear 68 and body 64. Another gear 58 can be coupled in at least a fixed rotational position with mounting arm 46 at the pivot point 50 between mounting arm 46 and seatback 22. The relative positioning of pivot points 50 and 70 can be such that gears 68 and 58 are in an operable mesh relationship with, or otherwise mating with, each other. Accordingly, rotation of arm 46, such as during movement of seat 10 between the forward-facing and rearward-facing positions can drive corresponding movement of anchor assembly 62 to the desired angle A1 for the particular position of seat 10.

The ratio between gears 68 and 58 can be adjusted to provide the desired movement of anchor assembly 62 given the range of rotation of arm 46 during reconfiguration of seat 10. The particular configuration of mounting assembly 36, including considerations related to the size and position of cushion 12 and seatback 22 can result in varying amounts of angular rotation during movement of seat 10 between forward-facing and rearward facing configurations. Further, similar configurations can result in different desired angles A1 for anchor assembly 62, which can, in turn, result in different amounts of angular rotation thereof during reconfiguration of seat 10. For example, mounting assembly 36 can be configured such that mounting arms 44 and 46 rotate through an angle A2 of between about 160° and about 180° degrees during reconfiguration of seat 10. In the same example, it can be desired for anchor assembly 62 to rotate through an angle A3 of between about 30° and about 60°. The ratio of gear 68 to gear 58 (in size, measured by diameter or ratio, or in number of teeth, for example) can be selected to achieve the desired rotational angle of travel A3 for the given rotational angle of travel A2. In the example above, the ratio of gear 68 to gear 58 can be between about 1:1 and about 1:2, depending on the particular angles of travel A3 and A2 in a given seat 10.

Figure 9:
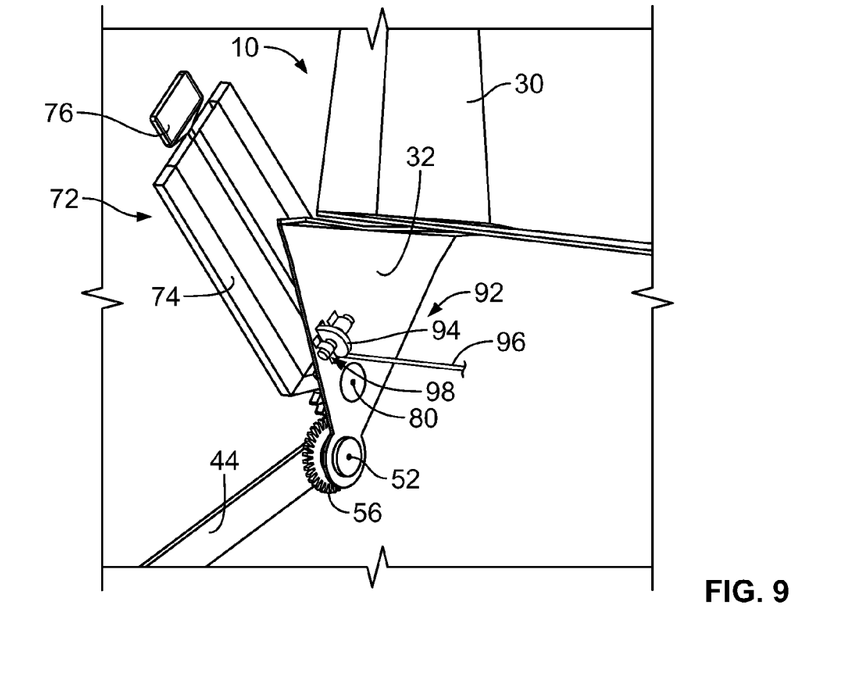
FIG. 9 is a detail view showing additional internal features associated with the restraint system.

By configuring anchor assembly 62 with the above-described rotational movement driven by reconfiguration of seat 10 between forward-facing and rearward-facing positions, the adjacent portion of webbing 60 can be positioned to extend over the lap of the user as desired, and can be put in a position more readily accessible by an occupant of the seat during buckling. It may further be desired to position the portion of webbing opposite anchor assembly 62 and adjacent buckle assembly 72 in a manner similar to anchor assembly 62 in the forward- and rearward-facing seat 10 positions. Accordingly, buckle assembly 72 can also include a gear 78 coupled with buckle arm 74 by a similar rotational coupling and axially aligned with the pivot point 80 at which buckle arm 74 is coupled to seatback 22 (e.g., to seatback bracket 32, as shown in FIG. 9). As such, pivot point 80 can be positioned relative to the pivot point 52 between mounting arm 44 and seatback 22 (which can also be positioned on bracket 32, for example) such that gear 78 can operably mesh with gear 56 rigidly coupled to mounting arm 44.

Gears 78 and 56 can have a similar or identical ratio to that of gears 68 and 58 to provide for similar driven repositioning of buckle assembly 72 during repositioning of seat 10 in a manner similar to that of anchor assembly 62. For example, the mesh relationship between gears 78 and 56 can position buckle assembly 72 at angles similar to or, in some examples equal to, angles A1 and A1' corresponding to a forward-facing seat 10 configuration or a rearward-facing seat 10' configuration. Similarly, gears 78 and 56 can be configured to provide for driven angular movement of buckle assembly 72 through an angle similar to or the same as angle A3. Some variations in the particular position and rotational angles of buckle assembly 72 compared to those of anchor assembly 62 may be desired depending on the particular construction or design of buckle assembly 72, anchor assembly 62, and other components of seat 10. Such driven repositioning of buckle assembly 72 and anchor assembly 62 can provide for user convenience and comfort during seatbelt use in a vehicle seat 10 with a reversible construction.

Alternative structures, components, or devices can be used to achieve the above-described driven reconfiguration of buckle assembly 72 and anchor assembly 62. For example, friction rollers having similar ratios to those of gears 78 and 56 or 68 and 58 can be incorporated as an alternative to gears. Further, a system of pulleys and cables can be used to drive rotational movement of buckle assembly 72 and/or anchor assembly 62, or a series or linkages affixed between buckle assembly 72 or anchor assembly 62 and the corresponding mounting arms 44 and 46 can be incorporated for driven reconfiguration. In yet another example, a reversible seat similar to seat 10 can incorporate motors to automatically reverse the seat between configurations. In such an example, motors can also drive the movement of buckle assembly 72 and anchor assembly 62 in a coordinated manner with the repositioning of seat 10.

In a further example, seat 10 can include a pretensioner mechanism 92 associated with buckle assembly 72. In general, pretensioners may be included in restraint systems to pull out slack in a seatbelt upon detection of a potential crash condition. As shown in FIG. 7 pretensioner mechanisms 92 can be positioned within seatback 22 and can include a cable 96 that can be coupled to a mechanical actuator or the like (not shown) mounted within seatback 22 to apply a force to cable 96, when directed by a crash-detection system within vehicle 2. Cable 96 can be oppositely coupled with buckle receptacle 76, which can be moveable in a direction toward pivot point 80, which can occur when the actuator applied the aforementioned force to cable 96. Cable 96 can further be routed through bracket 32 (or another associated portion of seatback frame 30) through an aperture 98 to extend with buckle arm 74 toward buckle receptacle 76. A pulley 94 can also be coupled with bracket 32 or the like within or adjacent aperture 98 to redirect cable 96, as discussed.

In the example shown in FIG. 7, aperture 98 and pulley 94 are shown in a position to align with buckle arm 74 when seat 10 is in the forward-facing configuration. In such an example, pretensioner mechanism 92 can be disabled when seat 10' is in the rearward-facing configuration. Alternatively, an additional cable or an additional pretensioner as a whole can be similarly provided to align with buckle arm 74 in the reverse configuration. As a further alternative, additional pulleys or the like can be incorporated with pretensioner 92 such that cable 96 is appropriately routed to buckle receptacle when seat 10 is in either the frontward- or rearward-facing configuration.

Another embodiment can include two separate restraint systems, of the type discussed above associated with opposite sides of a bench seat. Such a bench seat can include a similar mechanism for reconfiguration between forward-facing and rearward-facing positions. Further, the restraint components can include the above-described reversible buckle assembly and anchor assemblies similarly driven in rotation between positions by reconfiguration of the bench seat.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat, comprising:
   a back;
   a cushion;
   a mounting assembly supporting the cushion and including
      a first mounting arm coupled with the back, rotatable such that the back is translatable over the cushion, and having a first gear; and
      a first restraint arm coupled with the back and having a second gear mating with the first gear to drive a corresponding rotation of the restraint arm by translation of the back.

2. The vehicle seat of claim 1, wherein a gear ratio between the first and second mating gears is between about 1:1 and about 1:2.

3. The vehicle seat of claim 1, wherein:
   the cushion has a first edge and a second edge; and
   the back is translatable over the cushion between a first position in which the back is adjacent the first edge of the cushion and a second position in which the back is adjacent the second edge of the cushion.

4. The vehicle seat of claim 3, wherein the corresponding rotation of the first restraint arm with the translation of the back is such that:
   when the back is in the first position, the first restraint arm is at a corresponding first angle and disposed between the back and the cushion generally toward the second edge; and
   when the back is in the second position, the first restraint arm is at a corresponding second angle and disposed between the back and the cushion generally toward the first edge.

5. The vehicle seat of claim 1, wherein the first restraint arm includes a buckle receptacle mounted thereon.

6. The vehicle seat of claim 5, wherein the mounting assembly includes a second mounting arm coupled with the back opposite the first mounting arm and rotatable with respect to the cushion, the vehicle seat further including a restraint anchor coupled with the seat back and operatively coupled with the second arm such that the translation of the seat back further drives a corresponding rotation of the seatbelt anchor.

7. The vehicle seat of claim 1, wherein the first restraint arm includes a restraint anchor.

8. The vehicle seat of claim 7, further including:
   a seatbelt retractor affixed within the back on a side thereof adjacent the first restraint arm;
   a seatbelt positioner coupled with the back within an opening between an exterior and an interior of the back; and
   a seatbelt webbing coupled at a first and with the retractor, extending through the seatbelt positioner and coupled at a second end with the restraint anchor.

9. A vehicle restraint system, comprising:
   a buckle assembly including:
      a first arm having a buckle receptacle thereon and including a first rotational coupling opposite the receptacle and a first gear axially aligned with the first rotational coupling; and
      a seatbelt pretensioner coupled with the buckle receptacle at a cable extending through a portion of the first arm;
   an anchor including a body and having a second rotational coupling and a second gear affixed with the body and axially aligned with each other;
   a webbing affixed with the body of the anchor; and
   a buckle insert receiving the webbing therethrough and removably affixable with the buckle receptacle.

10. The vehicle restraint system of claim 9, wherein the first gear and the second gear are of equal diameter.

11. The vehicle restraint system of claim 9, wherein first and second gears are sized to respectively couple the buckle assembly and the anchor to a seat mounting assembly of a vehicle such that the buckle assembly and the anchor are driven in a rotational movement thereof by a corresponding movement of a portion of the seat mounting assembly.

12. The vehicle restraint system of claim 9, wherein the buckle assembly and the anchor are operably couplable with respective portions of a reversible vehicle seat by the respective first and second rotational couplings, and wherein the first and second gears are operable to drive rotation of the buckle assembly and the anchor that corresponds with a reversing movement of the vehicle seat.

13. The vehicle restraint system of claim 9, wherein a gear ratio between the first and second gears is between about 1:1 and about 1:2.

14. A vehicle, comprising:
   a seat including:
      a back;
      a cushion; and
      a mounting assembly supporting the cushion, and including a first mounting arm having a first gear and being pivotably coupled with the back for translation thereof over the cushion; and
   a restraint including:
      a restraint arm coupled with the back and including a second gear mating with the first gear such that translation of the back drives a corresponding rotation of the restraint arm; and
      a webbing coupled with the restraint arm and with the back.

15. The vehicle of claim 14, wherein:
   the first mounting arm is pivotably coupled with the back and the cushion.

16. The vehicle of claim 15, wherein:
   the first gear is affixed to the restraint arm at a coupling location between the restraint arm and the back; and
   the second gear is affixed to the first mounting arm at a coupling location between the first mounting arm and the back.

17. The vehicle of claim 14, wherein the restraint arm includes one of an anchoring body and a seatbelt buckle receptacle coupled therewith.

18. The vehicle of claim 14, wherein:
   the cushion has a first edge disposed toward a rear of the vehicle and a second edge disposed toward the front of the vehicle; and
   the back is translatable over the seat cushion between a first position in which the seat back is adjacent the first edge of the cushion and a second position in which the seat back is adjacent the second edge of the cushion.

19. The vehicle of claim 18, wherein the corresponding rotation of the restraint arm with the translation of the back is such that:
   when the back is in the first position, the restraint arm is at a corresponding first angle and disposed between the back and the cushion generally toward a front of the vehicle; and
   when the back is in the second position, the restraint arm is at a corresponding second angle and disposed between the back and the cushion generally toward a rear of the vehicle.

20. The vehicle of claim 14, wherein the restraint arm is a first restraint arm and includes a buckle receptacle mounted thereon; and
   the mounting assembly further includes a second mounting arm coupled with the back opposite the first mounting arm and rotatable with respect to the cushion, the vehicle seat further including a restraint anchor coupled with the seat back and operatively coupled with the second arm such that the translation of the seat back further drives a corresponding rotation of the seatbelt anchor.

* * * * *